L. B. LARSEN, O. J. HOLMES & H. G. LARSEN.
MOTION PICTURE MACHINE.
APPLICATION FILED OCT. 12, 1917. RENEWED OCT. 3, 1918.
1,293,128.
Patented Feb. 4, 1919.
2 SHEETS—SHEET 2.
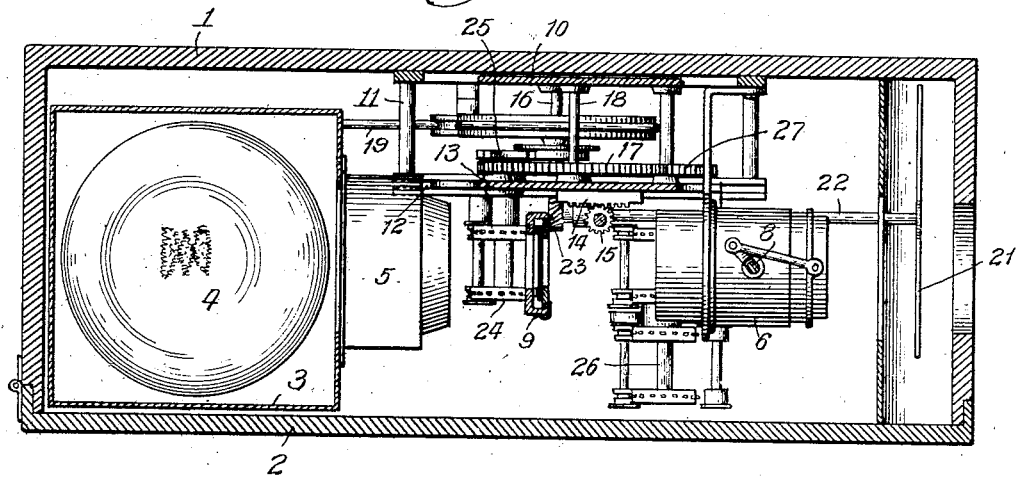
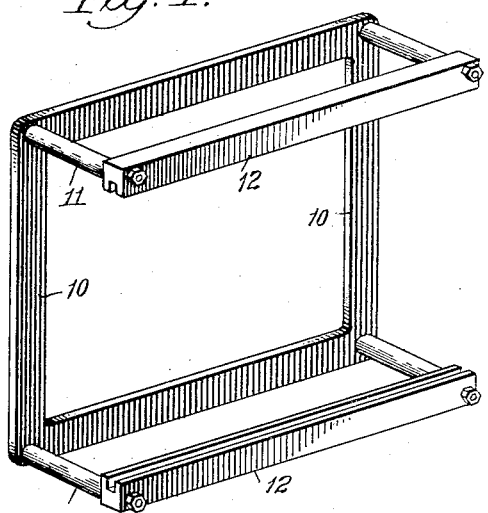
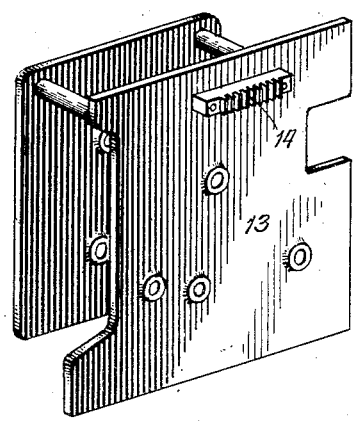
Witness:
John Enders
Inventors:
Louis B. Larsen,
Oscar J. Holmes and
Hans G. Larsen,
by Robert Burns
Atty.

UNITED STATES PATENT OFFICE.

LOUIS B. LARSEN, OSCAR J. HOLMES, AND HANS G. LARSEN, OF CHICAGO, ILLINOIS, ASSIGNORS TO ACME MOTION PICTURE PROJECTOR COMPANY, A CORPORATION OF ILLINOIS.

MOTION-PICTURE MACHINE.

1,293,128.      Specification of Letters Patent.      Patented Feb. 4, 1919.

Application filed October 12, 1917, Serial No. 196,129. Renewed October 3, 1918. Serial No. 256,761.

*To all whom it may concern:*

Be it known that we, LOUIS B. LARSEN, OSCAR J. HOLMES, and HANS G. LARSEN, citizens of the United States of America, and residents of Chicago, in the county of Cook, State of Illinois, have invented certain new and useful Improvements in Motion-Picture Machines, of which the following is a specification.

This invention relates to motion picture machines, and more especially to that type of machines in which the film is intermittently fed past the light aperture of the machine. And the present improvement has for its object:—

To provide a structural formation and association of parts whereby the framing or adjustment of the pictures of the film with relation to the light aperture of the machine is attained in a ready, accurate and efficient manner, and without change in the proper relation of the other accessory mechanisms of the machine, all as will hereinafter more fully appear. In the accompanying drawings:—

Fig. 2, is a plan view of the mechanism, with the inclosing casing in section.

Fig. 3, is a detail perspective view of the longitudinally adjustable carriage of the mechanism.

Fig. 4, is a similar view of the track frame for said carriage.

Like reference numerals indicate like parts in the several views.

Figure 1:
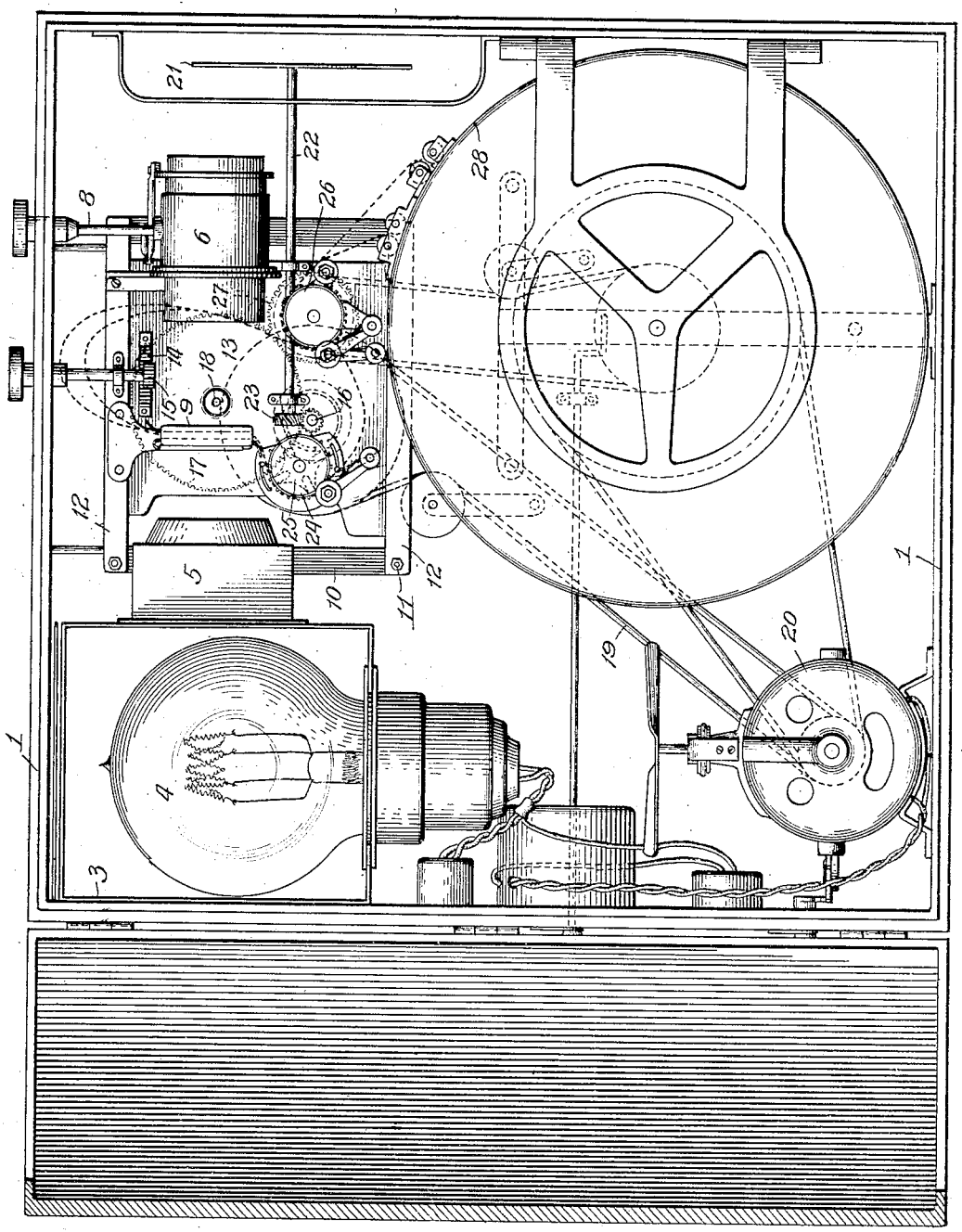
Figure 1, is a side elevation of a motion picture machine embodying the present invention, a hinged side wall or door of the inclosing casing being shown in an open condition and in section.

Referring to the drawings, 1 designates the inclosing casing for the mechanism, of any usual and suitable form and provided with a hinged side wall or door 2 for convenient access to the operating mechanisms and parts mounted within said casing.

3 designates the lamp house, arranged in an upper and rear portion of the casing 1 and containing the usual light producing incandescent electric lamp 4, or other usual light producing means of the machine.

5 designates an optical condenser of the usual construction and arranged in fixed association with the lamp house 3, and in alined relation with the filament of the lamp 4 and in like alined relation with the objective of the machine.

6 designates the aforesaid objective arranged a distance in front of the condenser 5, with its adjustable portion capable of focusing adjustment by a crank arm and pitman connection 7, with the operating shaft, 8 of the same extending out through the top wall of the casing 1 and provided with an operating knob or handle for convenient manual operation.

9 designates the apertured film guide or plate by which the picture film is guided transversely through the optical center of the machine and in proper spaced relation to the rear of the objective 6 aforesaid. The film guide 9 may be of any usual and suitable construction, and in the present improvement is separate from the film feeding mechanism, and is fixed in relation to said mechanism and to the condenser 5 and objective 6 aforesaid. The fixed condition of said film guide 9 is preferably attained by an attachment of the same to the fixed track frame of the film feeding mechanism above referred to.

10 designates a track frame, fixedly secured to a side wall of the casing 1 and provided with horizontally extending posts 11, to the other ends of which are secured upper and lower longitudinally disposed tracks or slideways 12 for the guidance of the carriage of the film feeding mechanism hereinafter described, in a direction parallel to the optical axis of the objective 6 aforesaid.

13 designates the carriage above referred to, preferably formed by a pair of vertically disposed plates secured together in spaced relation with one of said plates having sliding engagement with the aforesaid track or slideways 12 aforesaid.

14 designates a toothed rack secured to the carriage 13, and 15 designates an operating pinion, the shaft of which is journaled on the track frame 10 and extends out through the top wall of the casing 1 for convenient manual actuation in an adjustment of the carriage 13 in a longitudinal plane.

16 designates a driving shaft by which the intermittent film feeding mechanism and the light shutter of the machine are operated in unison. Said shaft 16 is journaled in the carriage 13, and in addition to the usual gearing connections 17 with an operating shaft 18 capable of manual rotation, has power connections by pulleys and endless belt 19 with an electric motor 20 arranged in the casing 1 aforesaid. In the type of portable machine shown in Fig. 1 the aforesaid electric motor 20 furnishes the power for operating the film rewinding mechanism hereinafter referred to, and the details of which form the subject matter of a separate application for Letters Patent Serial No. 200,878 filed Nov. 8, 1917.

21 designates the light shutter preferably of the radial bladed type, and carried by a shaft 22 journaled longitudinally on the carriage 13 aforesaid, so as to be adjustable longitudinally therewith, and provided at its rear end with gearing connection 23 with the driving shaft 16 above described.

24 designates the intermittent film feeding sprocket drum journaled in the carriage 13 aforesaid, in vertical alinement beneath the film guide or plate 9 aforesaid and carrying the driven element of an intermittent gearing device, such as the ordinary Geneva movement 25 shown, with the driving element of said intermittent gearing carried by the operating shaft 16 aforesaid.

26 designates the sprocket drum by which a free loop of the picture film is maintained at the entrance end of the film guide or plate 9 aforesaid, as shown in dotted lines in Fig. 1, and as usual in the present class of machines. The carrying shaft of the drum 26 is journaled in the carriage 13 aforesaid, and receives constant rotation from the shafts 16, 18 through a train of gears 27, of which the gear 17 above described, forms a part. Said sprocket drum 26 is preferably arranged in a plane to one side of the intermittent film feeding sprocket drum 24 aforesaid, and in line with the film delivery reel of the machine, while said film feeding sprocket drum 24 is in line with the film take-up reel of the machine in its normal operation as a projection apparatus.

The take-up and delivery reels above referred to, are preferably arranged in a magazine or casing 28 located in the inclosing casing 1 of the machine, and are preferably controlled and rendered automatic in action.

With the present improvement a longitudinal adjustment of the carriage 13 and film feeding mechanism mounted thereon, in a direction parallel to the optical axis of the objective 6, is adapted to effect an independent framing movement or adjustment of the picture film in relation to the light aperture of the film guide or plate 9 aforesaid, in accordance with the rearward or forward adjustments of the carriage 13. In that the light shutter 21 receives a corresponding adjustment, the relative and proper adjustment of the same with relation to the associate mechanisms is preserved without change.

Having thus fully described our said invention, what we claim as new and desire to secure by Letters Patent, is:—

1. In a motion picture machine, the combination of an objective, an apertured film guide having fixed relation to said objective, and a film feeding mechanism having adjustment in a direction parallel to the optical axis of said objective, substantially as set forth.

2. In a motion picture machine, the combination of an objective, an apertured film guide having fixed relation to said objective, and a film feeding mechanism and associated light shutter having adjustment in a direction parallel to the optical axis of said objective, substantially as set forth.

3. In a motion picture machine, the combination of an objective, an apertured film guide having fixed relation to said objective, a carriage having a sliding adjustment in a direction parallel to the optical axis of said objective, and a film feeding mechanism mounted on and adjustable with said carriage, substantially as set forth.

4. In a motion picture machine, the combination of an objective, an apertured film guide having fixed relation to said objective, a carriage having a sliding adjustment in a direction parallel to the optical axis of said objective, and a film feeding mechanism and associated light shutter mounted on and adjustable with said carriage, substantially as set forth.

5. In a motion picture machine, the combination of a casing, an objective associated with said casing, an apertured film guide having fixed relation to said objective, a track frame secured to a side wall of said casing and having horizontal posts, longitudinally arranged tracks secured to said posts, a carriage sliding in said tracks, in a direction parallel to the optical axis of the objective, means for imparting longitudinal adjustment to said carriage, and a film feeding mechanism mounted on and adjustable with said carriage, substantially as set forth.

6. In a motion picture machine, the combination of a casing, an objective associated with said casing, an apertured film guide having fixed relation to said objective, a track frame secured to a side wall of said casing and having horizontal posts, longitudinally arranged tracks in a direction parallel to the optical axis of the objective secured to said posts, a carriage sliding in said tracks, means for imparting longitudinal adjustment to said carriage, and a film feeding mechanism and associated light shutter mounted on and adjustable with said carriage, substantially as set forth.

7. In a motion picture machine, the combination of a casing, an objective associated with said casing, an apertured film guide having fixed relation to said objective, a track frame secured to a side wall of said casing and having horizontal posts, longitudinally arranged tracks secured to said posts, a carriage comprising a pair of separated plates one of which has sliding engagement with said tracks, means for imparting longitudinal adjustment to said carriage, and a film feeding mechanism mounted on and adjustable with said carriage, substantially as set forth.

8. In a motion picture machine, the combination of a casing, an objective associated with said casing, an apertured film guide having fixed relation to said objective, a track frame secured to a side wall of said casing and having horizontal posts, longitudinally arranged tracks secured to said posts, a carriage comprising a pair of separated plates one of which has sliding engagement with said tracks, means for imparting longitudinal adjustment to said carriage, and a film feeding mechanism and associated light shutter, mounted on and adjustable with said carriage, substantially as set forth.

9. In a motion picture machine, the combination of a casing, an objective associated with said casing, an apertured film guide having fixed relation to said objective, a track frame secured to a side wall of said casing and having horizontal posts, longitudinally arranged tracks secured to said posts, a carriage sliding in said tracks, in a direction parallel to the optical axis of the objective, a rack and pinion associated with said parts for imparting longitudinal adjustment to the carriage, and a film feeding mechanism mounted on and adjustable with said carriage, substantially as set forth.

10. In a motion picture machine, the combination of a casing, an objective associated with said casing, an apertured film guide having fixed relation to said objective, a track frame secured to a side wall of said casing and having horizontal posts, longitudinally arranged tracks secured to said posts, a carriage sliding in said tracks in a direction parallel to the optical axis of the objective, a rack and pinion associated with said parts for imparting longitudinal adjustment to the carriage, and a film feeding mechanism and associated light shutter mounted on and adjustable with said carriage, substantially as set forth.

11. In a motion picture machine, the combination of a casing, an objective and a condenser arranged in alined and spaced relation in said casing, an apertured film guide secured fixedly between said objective and condenser, and a film feeding mechanism having adjustment in a direction parallel to the optical axis of said objective, substantially as set forth.

12. In a motion picture machine, the combination of a casing, an objective and a condenser arranged in alined and spaced relation in said casing, an apertured film guide secured fixedly between said objective and condenser, and a film feeding mechanism and associated light shutter having adjustment in a direction parallel to the optical axis of said objective, substantially as set forth.

13. In a motion picture machine, the combination of a casing an objective and a condenser arranged in alined and spaced relation in said casing, an apertured film guide secured fixedly between said objective and condenser, a carriage having a sliding adjustment in a direction parallel to the optical axis of said objective, and a film feeding mechanism mounted on and adjustable with said carriage, substantially as set forth.

14. In a motion picture machine, the combination of a casing an objective and a condenser arranged in alined and spaced relation in said casing, an apertured film guide secured fixedly between said objective and condenser, a carriage having a sliding adjustment in a direction parallel to the optical axis of said objective, and a film feeding mechanism and associated light shutter mounted on and adjustable with said carriage, substantially as set forth.

Signed at Chicago, Illinois, this 10th day of October, 1917.

LOUIS B. LARSEN.
OSCAR J. HOLMES.
HANS G. LARSEN.